(12) United States Patent
Hoskins et al.

(10) Patent No.: US 6,678,106 B2
(45) Date of Patent: Jan. 13, 2004

(54) DETERMINING DATA SECTOR SPLITS ACROSS SERVO BURSTS IN A DISC DRIVE

(75) Inventors: Edward Sean Hoskins, Longmont, CO (US); Ewe Chye Tan, Longmont, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 191 days.

(21) Appl. No.: 09/822,534

(22) Filed: Mar. 30, 2001

(65) Prior Publication Data
US 2001/0046098 A1 Nov. 29, 2001

Related U.S. Application Data

(60) Provisional application No. 60/193,302, filed on Mar. 30, 2000.

(51) Int. Cl.[7] .................................................. G11B 5/09
(52) U.S. Cl. ........................... 360/48; 360/51; 360/46; 360/77.08; 360/50; 360/77.06
(58) Field of Search ............................... 360/46, 48, 60, 360/51, 77.08, 77.06, 77.01, 77.04, 77.07

(56) References Cited

U.S. PATENT DOCUMENTS

| 5,255,136 A | 10/1993 | Machado et al. ......... 360/77.02 |
| 5,422,763 A | 6/1995 | Harris ........................ 360/51 |
| 5,455,721 A | 10/1995 | Nemazie et al. ............... 360/51 |
| 5,523,903 A | 6/1996 | Hetzler et al. ........... 360/77.08 |
| 5,740,358 A | 4/1998 | Geldman et al. ...... 395/184.01 |
| 5,754,351 A * | 5/1998 | Kuen et al. ................... 360/48 |
| 5,768,043 A * | 6/1998 | Nemazie et al. ......... 360/77.08 |
| 5,818,654 A | 10/1998 | Reddy et al. ................. 360/53 |
| 5,959,795 A * | 9/1999 | Wu .............................. 360/27 |
| 5,963,386 A | 10/1999 | Assouad ...................... 360/48 |
| 6,008,960 A * | 12/1999 | Belser ......................... 360/48 |
| 6,144,514 A * | 11/2000 | Wu .............................. 360/51 |

* cited by examiner

*Primary Examiner*—David Hudspeth
*Assistant Examiner*—Natalia Figueroa
(74) *Attorney, Agent, or Firm*—David K. Lucente; Derek J. Berger

(57) ABSTRACT

A method and system for determining data sector splits across servo bursts in a disc drive having a data disc with an embedded servo configuration. The disc drive includes a data transducer selectively positionable over the data disc for transferring data to and from the data disc, and the data disc includes a plurality of zones of predefined tracks. The method includes locating one or more frame table parameters based on a new zone position, creating a plurality of new frame table entries, while the disc drive is in operation, based on the frame table parameters, and moving the data transducer from a past zone position to the new zone position. The disc drive includes parameter memory and frame table memory. The parameter memory contains a plurality of zone records, with the zone records containing a plurality of zone table parameters. The frame table memory is utilized to store a frame table. A frame table generator is coupled with the parameter memory and the frame table memory and is configured to create a new frame table in the frame table memory when the data transducer is required to move to a new zone position.

14 Claims, 8 Drawing Sheets

DETERMINING DATA SECTOR SPLITS ACROSS SERVO BURSTS IN A DISC DRIVE

RELATED APPLICATIONS

This application claims priority of U.S. provisional application Serial No. 60/193,302 filed Mar. 30, 2000.

FIELD OF THE INVENTION

This application relates generally to a method and system of locating data on disc drives, and more particularly to a method and system of dynamically locating data sector splits across servo bursts.

BACKGROUND OF THE INVENTION

Disc drives are data storage devices that store digital data in magnetic form on a storage medium on a rotating data disc. Modern disc drives comprise of one or more rigid data discs that are coated with a magnetizable medium and mounted on the hub of a spindle motor for rotation at a constant high speed. An array of transducers, referred to as "data heads" or "heads," are mounted to an actuator arm, and a servo system is used to move the actuator arm such that a particular head is positioned over a desired location for reading or writing information to and from the disc. During a write operation, the head writes data onto the disc and during a read operation the head senses the data previously written on the disc and transfers the information to an external environment.

Data on the data disc is typically stored on concentric circular tracks along the surface of the disc. Often, the disc is divided into several disc "zones" which contain regions of adjacent tracks with a common recording bit rate. Some disc drive configurations intersperse servo information at various points along each track for maintaining accurate head positioning over the disc. Servo information is typically written to each track in designated servo burst sectors and divides each disc track into slices called data wedges. As the disc rotates, the head reads the servo information contained in the servo bursts and sends the servo information back to the servo system to make any necessary position adjustments to the actuator arm.

Additionally, every track may be divided into discrete data sectors containing packets of user data. A data sector generally contains a user data field that is encapsulated with servo data to help identify and process the user data. Because data sector fields are typically fixed-length fields, they may be required to split across servo bursts when an integer number of data sectors cannot fit within a data wedge. When a data sector split occurs, a portion of the data sector is located before the servo burst and another portion of the data sector is located after the servo burst. In general, knowing which data sectors are split and where in the data sectors a split occurs is critical to locating desired data on the data disc.

One conventional method of tracking data sector splits on a disc is to store information about every data sector split occurrence in memory. The information stored about a split data sector may include the sector's zone location, data wedge number, sector number, and split count (i.e. where in the data sector the split occurs). Data sector split information is typically determined and recorded in memory during the disc drive manufacturing process. By storing such information about each data sector split occurrence, accurate location of data on the disc drive is achieved.

A drawback of storing information about every data sector split occurrence is that the memory required to store such information can be very large. Modern disc drives typically contain many thousands of split data sectors, and storing several data entries for each split data sector requires substantial memory. Reserving large amounts of memory for storing data sector splits may raise the production cost of the disc drive, consume the drive's resources, and slow the drive's performance.

One known method of reducing the amount of memory required to keep track of split data sectors is to take advantage of repeating patterns of data sector splits present in many disc drive configurations. A pattern of split and non-split data sectors is typically referred to as a repeating "frame." By storing information about repeating frames on the data disc, rather than storing information about every occurrence of a data sector split, the amount of memory required to locate data sector splits can be greatly reduced. Typically, a "frame table" is used to store information about each repeating frame.

A frame table describing a repeating frame often includes the number of wedges in the frame followed by a series of entries describing each data wedge in the frame. The data wedge entries may include an offset count from the beginning of the frame, the number of sectors in the data wedge, and a split count for the last data sector in the data wedge. Frame tables are generally created and recorded into memory during the disc drive manufacturing process. After storing the frame tables in memory, they are accessed as needed during disc drive operation to locate disc data.

Although frame tables help reduce the amount of memory required to locate data sector splits, the amount of memory used may still be substantial. Multiple frame tables are typically required for each disc zone on a data disc because the number of wedges in a frame is dependent, in part, on the circumference of a track, the data rate, and servo sampling rate. As the storage capacity of modern disc drives continues to increase, greater numbers of zones per head are generally employed. In addition, many modern disc drives utilize variable bits per inch per head to increase disc storage capacity. Variable bits per inch per head, however, generally require unique frame tables for each head. Thus, as the number of heads used in such disc drives increases, so does the number of frame tables stored in memory. Such factors may force manufacturers to consume more and more memory for frame table storage.

SUMMARY OF THE INVENTION

Against this backdrop the present invention has been developed. The present invention provides a method of determining data sector splits across servo bursts, wherein a servo burst and a plurality of data sectors define a wedge, and a plurality of wedges define a frame. The method includes the steps of locating one or more frame table parameters based on a new zone position, creating a plurality of new frame table entries while the disc drive is in operation based on the frame table parameters, and moving the data head from a past zone position to the new zone position.

The present invention may also be embodied as a disc drive having an embedded servo configuration on a data disc. A plurality of zones of predefined tracks is located on the data disc, and disc drive includes a data transducer selectively positionable over the data disc for transferring data to and from the data disc. The data disc further includes data sector splits across servo bursts, wherein a servo burst and a plurality of data sectors define a wedge, and a plurality of wedges defines a frame. The disc drive also includes parameter memory having a plurality of zone records, the zone records including a plurality of zone table parameters. The disc drive also includes frame table memory for storing a frame table, and a frame table generator coupled with the parameter memory and the frame table memory. The frame table generator is configured to create a new frame table in the frame table memory when the data transducer is required to move to a new zone position.

An alternative embodiment of the present invention may be a method of determining data sector splits across servo bursts in a disc drive having an embedded servo configuration on a data disc. The data disc includes a plurality of zones of predefined tracks, and the disc drive includes a data transducer selectively positionable over the data disc for transferring data to and from the data disc. In this embodiment, a servo burst and a plurality of data sectors define a wedge, and a plurality of wedges defines a frame. The method includes the steps of determining a current zone position of the data transducer, locating a set of frame table parameters based on the current zone position of the data transducer, and determining frame table entries including a split count for the wedges from the frame table parameters during drive operation.

The present invention may also be embodied as a method for calculating data sector splits across servo bursts in a disc drive. The disc drive has an embedded servo configuration, with the disc drive including a plurality of zones of predefined tracks on a data disc and at least one transducer selectively positionable over the data disc. A pair of servo bursts defines a wedge having plurality of data sectors. The method includes the step of determining a new zone position of the transducer. The method further includes indexing a set of frame table variables based on the new zone position of the data head. The set of frame table variables includes a non-split sector phase count of clock pulses between a first servo burst and a data area, a wedge data count of clock pulses within the data area, a non-split sector data count of clock pulses within a sector, a split penalty count of clock pulses for a split sector, a minimum split count of clock pulses for the split sector, and a maximum split count of clock pulses for the split sector. The method also includes constructing a frame table from the frame table variables during drive operation.

These and various other features as well as advantages which characterize the present invention will be apparent from a reading of the following detailed description and a review of the associated drawings.

BRIEF DESCRIPTION OF THE DRAWINGS

FIG. 3-1 illustrates an exemplary structure of data sector as contemplated by the present invention.

FIG. 3-2 shows the data structure of an exemplary split data sector 224 as contemplated by the current invention.

DETAILED DESCRIPTION

Figure 1:
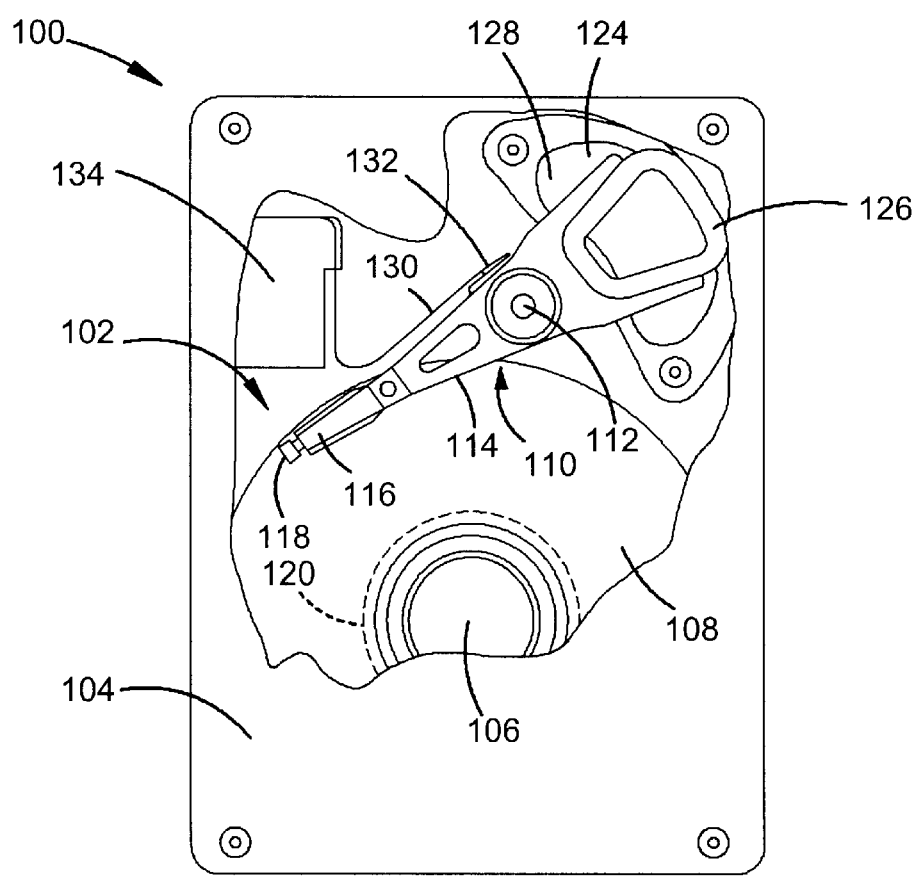
FIG. 1 is a plan view of a disc drive incorporating a preferred embodiment of the present invention showing the primary internal components.

A disc drive 100 constructed in accordance with an embodiment of the present invention is shown in FIG. 1. The disc drive 100 includes a base 102 to which various components of the disc drive 100 are mounted. A top cover 104, shown partially cut away, cooperates with the base 102 to form an internal, sealed environment for the disc drive in a conventional manner. The components include a spindle motor 106 which rotates one or more discs 108 at a constant high speed. Information is written to and read from tracks on the discs 108 through the use of an actuator assembly 110, which rotates during a seek operation about a bearing shaft assembly 112 positioned adjacent the discs 108. The actuator assembly 110 includes a plurality of actuator arms 114 which extend toward the discs 108, with one or more flexures 116 extending from each of the actuator arms 114. Mounted at the distal end of each of the flexures 116 is at least one data head 118 which includes an air bearing slider enabling the head 118 to fly in close proximity above the corresponding surface of the associated disc 108.

During a seek operation, the track position of the data heads 118 is controlled through the use of a voice coil motor (VCM) 124, which typically includes a coil 126 attached to the actuator assembly 110, as well as one or more permanent magnets 128 which establish a magnetic field in which the coil 126 is immersed. The controlled application of current to the coil 126 causes magnetic interaction between the permanent magnets 128 and the coil 126 so that the coil 126 moves in accordance with the well-known Lorentz relationship. As the coil 126 moves, the actuator assembly 110 pivots about the bearing shaft assembly 112, and the data heads 118 are caused to move across the surfaces of the discs 108.

The spindle motor 106 is typically de-energized when the disc drive 100 is not in use for extended periods of time. The heads 118 are moved over park zones 120 near the inner diameter of the discs 108 when the drive motor is de-energized. The heads 118 are secured over the park zones 120 through the use of an actuator latch arrangement, which prevents inadvertent rotation of the actuator assembly 110 when the heads are parked.

A flex assembly 130 provides the requisite electrical connection paths for the actuator assembly 110 while allowing pivotal movement of the actuator assembly 110 during operation. The flex assembly includes a preamplifier 132 to which head wires (not shown) are connected; the head wires being routed along the actuator arms 114 and the flexures 116 to the data heads 118. The preamplifier 132 typically includes circuitry for controlling the write currents applied to the data heads 118 during a write operation and a preamplifier for amplifying read signals generated by the heads 118 during a read operation. The flex assembly terminates at a flex bracket 134 for communication through the base deck 102 to a disc drive printed circuit board (not shown) mounted to the bottom side of the disc drive 100 which contains a disc controller 702 as discussed in detail below with reference to FIG. 7.

Figure 2:
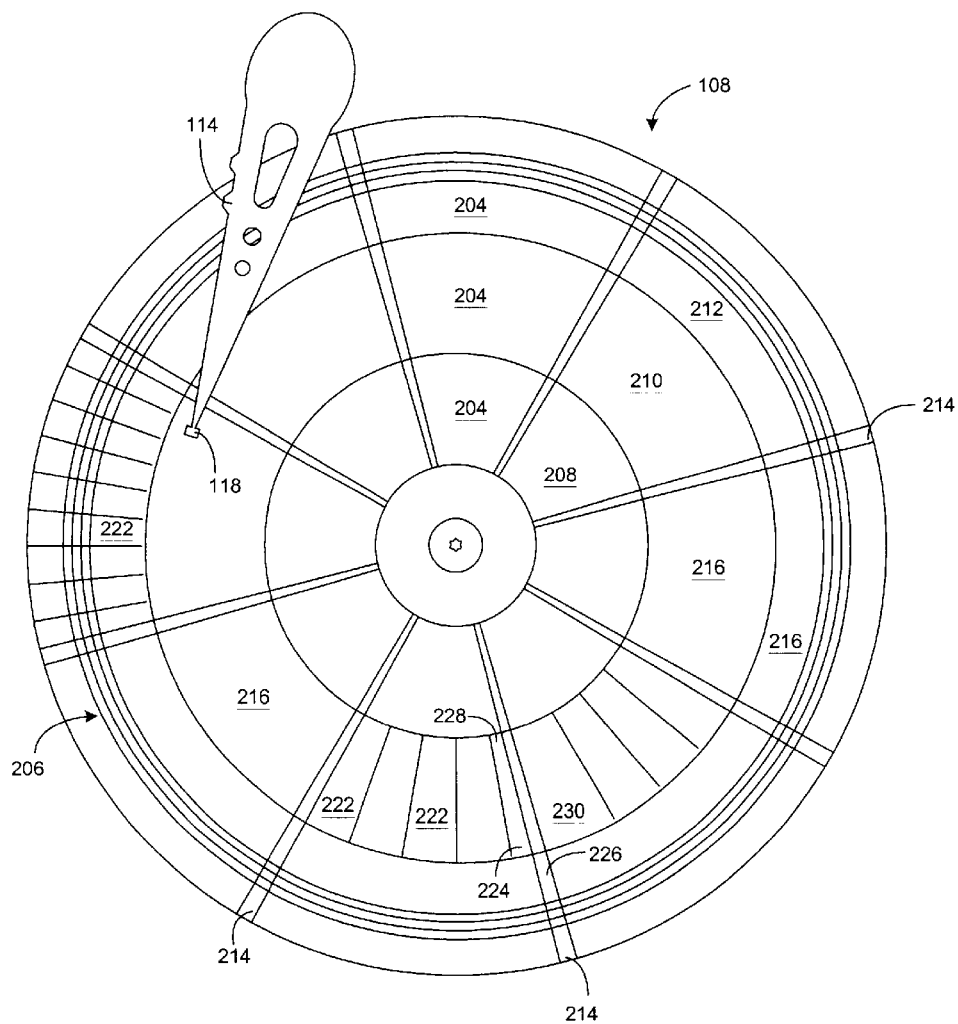
FIG. 2 shows the logical recording structure of an exemplary disc data in accordance with one embodiment of the present invention.

FIG. 2 shows the logical recording structure of an exemplary data disc 110 in accordance with one embodiment of the present invention. The disc 108 is divided into several concentric disc zones 204 which contain regions of adjacent tracks 206. For example, the magnetic disc 108 of FIG. 2 includes an inner zone 208, a center zone 210, and an outer zone 212. When configured with radial servo burst sectors 214, each disc track 206 is divided into slices called data wedges 216 between the burst sectors 214. The burst sectors 214 include data for maintaining accurate positioning of the data head 118 over a track 206 and are positioned at predetermined spaced locations around the disc 108. As the disc 108 rotates, the data head 118 reads the servo information containing an address within the servo bursts 214 and sends the servo information back to the servo system. The servo system checks whether the address in the servo information read from the burst sectors 214 corresponds to the desired head location. If the address does not correspond to the desired head location, the actuator arm 114 is adjusted until the head 118 is moved to the correct track location.

Each track 206 includes discrete data sectors 222 containing stored user information. The number of data sectors 222 contained in a particular track 206 depends, in part, on the length (i.e. circumference) of the track 206. Therefore, tracks 206 located at the outer zone 212 typically contain more data sectors 222 per data wedge 216 than tracks 206 located at the center zone 210. Similarly, tracks 206 located at the center zone 210 typically contain more data sectors 222 per data wedge 216 than tracks 206 located at the inner zone 208. Besides containing user information, each data sector 222 also includes other data to help identify and process the user information.

Figures 1, 3:
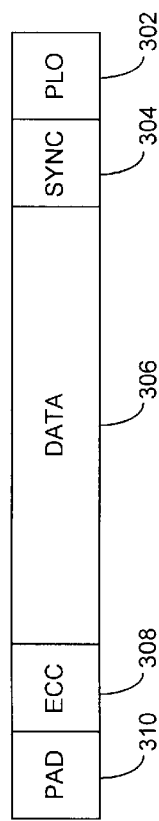
Figures 2, 3:
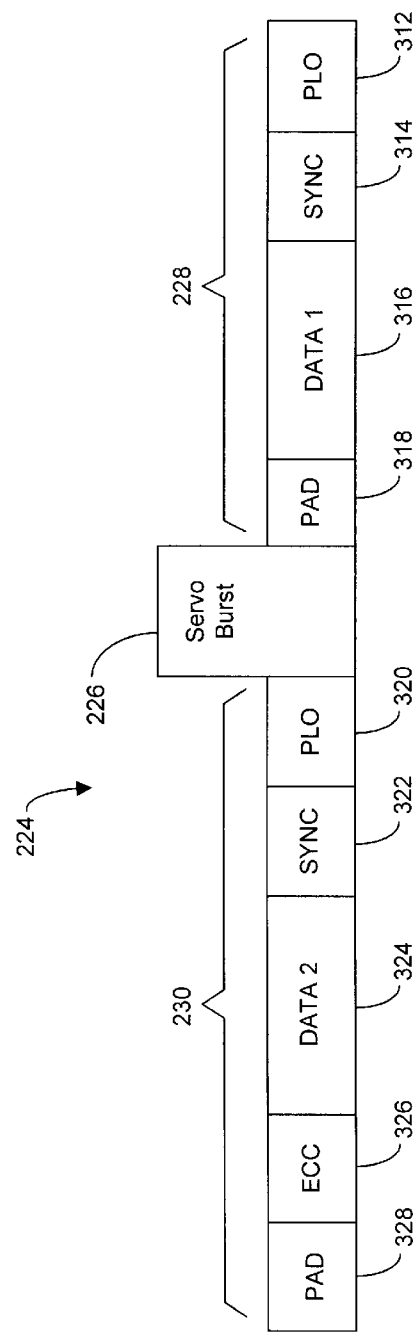

In FIG. 3-1, a representation of an exemplary data sector 222 as contemplated by the present invention is illustrated. The data sector 222 includes a phase locked oscillator (PLO) field 302, a synchronization (SYNC) field 304, a user-data field 306, an error correction code (ECC) field 308, and a pad (PAD) field 310. In general, each of the data sector fields is fixed in length. The PLO field 302 and the SYNC field 304 are used to calibrate the actuator arm 114 and the read/write speed of the head 118. The user data field 306 contains stored user information. The ECC field 308 is used to detect and correct errors in the data field 306. The PAD field 310 is used to complete read/write operations.

As discussed earlier, data sectors 222 with fixed length fields may be required to split across servo bursts 214 when an integer number of data sectors 222 cannot fit within a data wedge 214. Referring back to FIG. 2, for example, data sector 224 is shown split across servo burst 226, dividing data sector 224 into two separate sections 228 and 230. Typically, when a data sector split occurs, the PLO field 302, the SYNC field 304, and the PAD field 310 are repeated in the second section of the split data sector.

FIG. 3-2 shows the data structure of an exemplary split data sector 224 as contemplated by the current invention. Like the non-split data sector 222, the split data sector 224 begins with a PLO field 312, a SYNC field 314, and a user data field 316. Unlike the non-split data sector 222, the servo burst 226 interrupts the data field 316, forcing the split data sector 224 to end prematurely with a PAD field 318 placed between the data field 316 and the servo burst 226. After the servo burst 226, and in some cases a track identification section (not shown), the split data sector 224 is continued with a second PLO field 320 and a second SYNC field 322. The remaining portion of the data field 324 follows to second SYNC field 322. Finally, the ECC field 326 and a second PAD field 328 are located after the second data field 324. Thus, a split data sector 224 generally requires more track area to store a complete user data field 316 and 324 than a non-split data sector 222 since the PLO fields 312 and 320, SYNC fields 314 and 322, and PAD fields 318 and 328 are repeated. For this reason, the "split penalty" is referred to as the combination of the PLO, SYNC, and PAD fields.

In order to determine which data sectors 222 on the data disc 108 are split, as well as where within these data sectors 222 a split occurs, the present invention utilizes a frame table created while the disc drive 100 is in operation. As described in greater detail below, the frame table is constructed according to a set of stored frame table parameters and the current zone position of the data head 118. When the data head position changes to a new disc zone 204, a new frame table is created which replaces the previous frame table. In doing so, frame tables are swapped in and out of substantially the same memory location on an as-needed basis. Embodiments of the present invention, therefore, help reduce the amount of memory required to store frame table entries by using the same memory location to store multiple frame tables.

Figure 4:
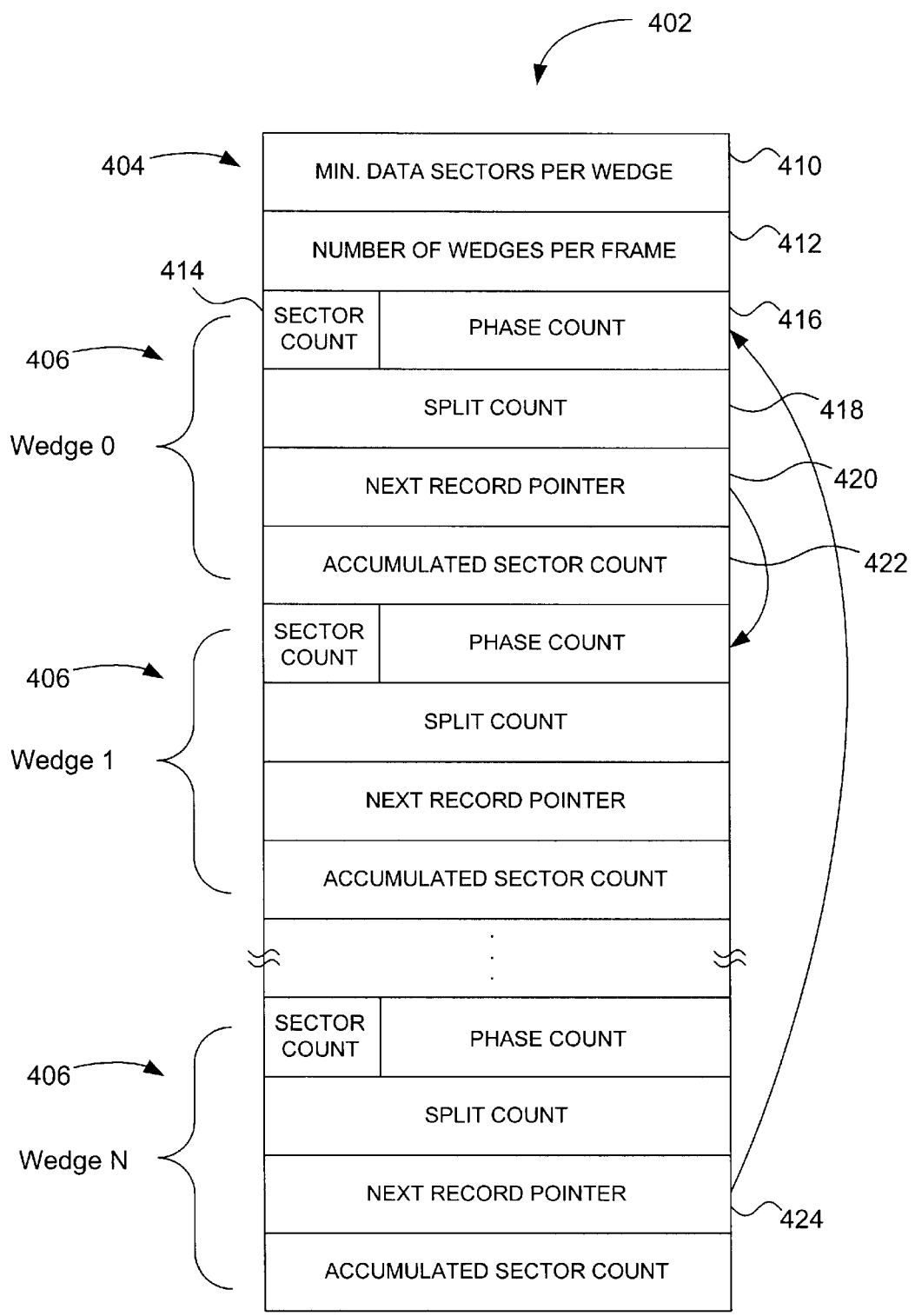
FIG. 4 shows the data structure of an exemplary frame table as contemplated by one embodiment of the present invention.

In FIG. 4, the data structure of an exemplary frame table 402 as contemplated by one embodiment of the present invention is illustrated. The frame table 402 includes a frame header 404 followed by a plurality of wedge records 406. The frame header 404 typically contains global frame attributes used by all the wedge records 406. The frame header 404 may include a Minimum Data Sectors Per Wedge entry 410 and a Number Of Wedges Per Frame entry 412. The Minimum Data Sectors Per Wedge entry 410 is used to calculate the number of data sectors in each data zone and may alternatively be stored In a separate hardware register. The Number Of Wedges Per Frame entry 412 contains the total number of data wedges making up the frame.

The wedge records 406 are listed below the frame header 404. Each wedge record 406 includes a number of successive memory locations which describe the data sector arrangement of a data wedge in the repeating frame. A wedge record 406 may include a Sector Count entry 414, a Phase Count entry 416, a Split Count entry 418, a Next Record Pointer entry 420, and an Accumulated Sector Count entry 422. The Sector Count entry 414, when added to the Min. Data Sectors Per Wedge entry 410, provides the number of data sectors, including the split data sector, in the data wedge. The Sector Count entry 414 is typically a small number and may occupy only a portion of a memory location. In the frame table 402 of FIG. 4, the Sector Count entry 414 is stored in the upper bits of a memory location also containing the Phase Count entry 416.

The Phase Count entry 416 contains the distance, measured in clock pulses, between the beginning of the data wedge and the first non-split data sector within the data wedge. The Split Count entry 418 contains the size, also measured in clock pulses, of the split data sector segment located within the data wedge. The Next Record Pointer entry 420 contains a memory address pointer to the next wedge record in the frame table, thereby creating a linked list of wedge records 406. The linked list is made circular by pointing the last Next Record Pointer entry 424 back to the first wedge record. Finally, the Accumulated Sector Count 422 contains the total number of data sectors between the first data wedge in the frame to the end of the current data wedge.

In general, the frame table 402 is employed when the disc drive 100 is looking for a particular data sector on the data disc, also known as a "seek" operation. The frame table entries are typically loaded in counters that are decremented according to clock pulses synchronized with the position of the data head 118 relative to the data disc 108 (see FIG. 1). In this manner, the disc drive 100 accurately finds data on the data disc, even when the data is located in a split data sector.

It should be noted that the frame table 402 of FIG. 4 serves to illustrate one type of frame table structure contemplated by the present invention and is not intended to limit the scope of the claimed invention. For example, those skilled in the art will recognize that the frame table 402 may be constructed as an array of wedge records rather than a linked list of wedge records. In addition, some entries may be eliminated from the frame table 402, while other entries may be added. These and other variations to frame table structure are considered within the spirit and scope of the present invention.

As mentioned above, the present invention creates a frame table while the disc drive 100 is in operation according to stored frame table parameters. It is contemplated that one or more frame table parameters are determined for each disc zone, where a disc zone is a region of adjacent tracks with a common bit density (i.e. the same number of data sectors per track). Preferably, the frame table parameters are calculated and stored in rewritable persistent memory, such as an EPROM, FLASH, or magnetic memory, during the manufacturing process of the disc drive 100. When an active data head moves to a new disc zone, the frame table parameters associated with the new disc zone are loaded and a new frame table is created. The newly created frame table overwrites the previously used frame table, thereby saving disc drive memory resources.

Figure 5:
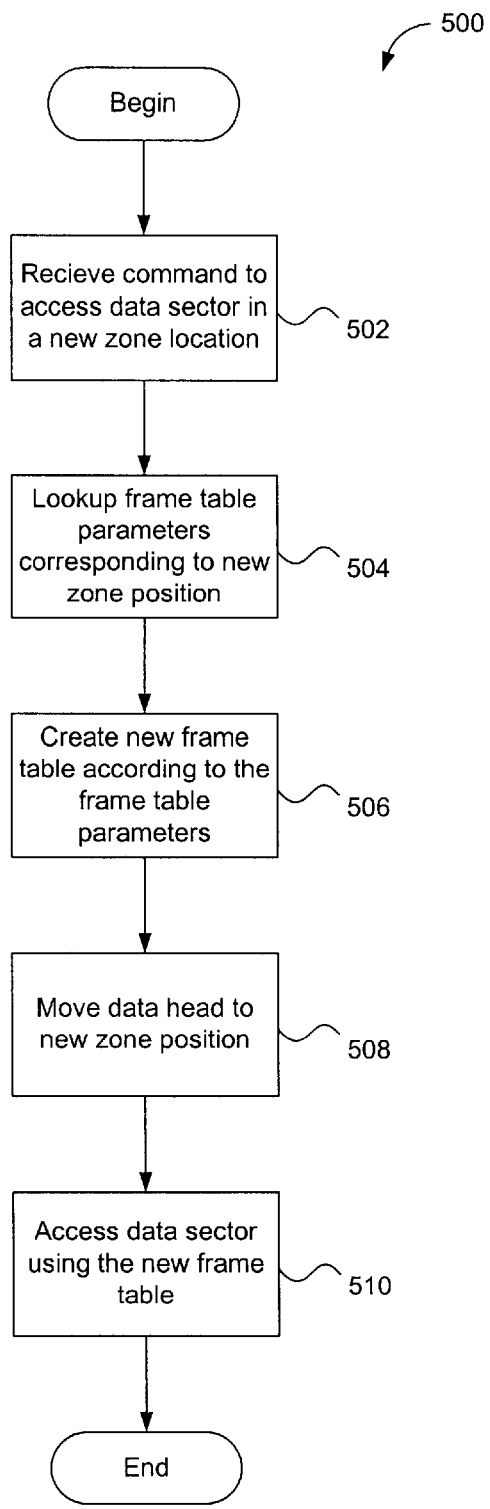
FIG. 5 shows an operational flow chart describing the operations in a disc controller to access a data sector located in a new zone position according to the present invention.

FIG. 5 shows an operational flow chart 500 describing the operations in a disc controller to access a data sector located in a new zone position according to the present invention. At step 502, the disc drive receives a command to access data in a new zone location. The new zone location is different than the zone location the data head is currently over. Typically, the disc controller receives access commands from an external environment, such as a computer operating system. The access commands may require the disc drive to read or write data to a specific disc drive location.

Lookup operation 504 retrieves frame table parameters, corresponding to the new zone to be accessed from memory. The frame table parameters contain information necessary to create a frame table for the new zone during disc drive operation. The frame table parameters are discussed in more detailed below. At step 506, a new frame table based on the retrieved frame table parameters is created in frame table memory by overwriting the previous frame table. The frame table construction based on the retrieved frame table parameters is also discussed in more detailed below.

At step 508, the data head is positioned to access the data sector required. The data head is moved across the disc by the actuator arm to the new disc zone and track containing the requested data sector. It is contemplated that movement of the data head can be undertaken at substantially the same time the frame table is constructed in operation 506. Once the data head arrives at the requested track, the new frame table is used to find the location of the data sector(s) called for by the command. As the data head traverses the spinning track below, the data sector is accessed at step 510 when the data head arrives at the required data sector.

Figure 6:
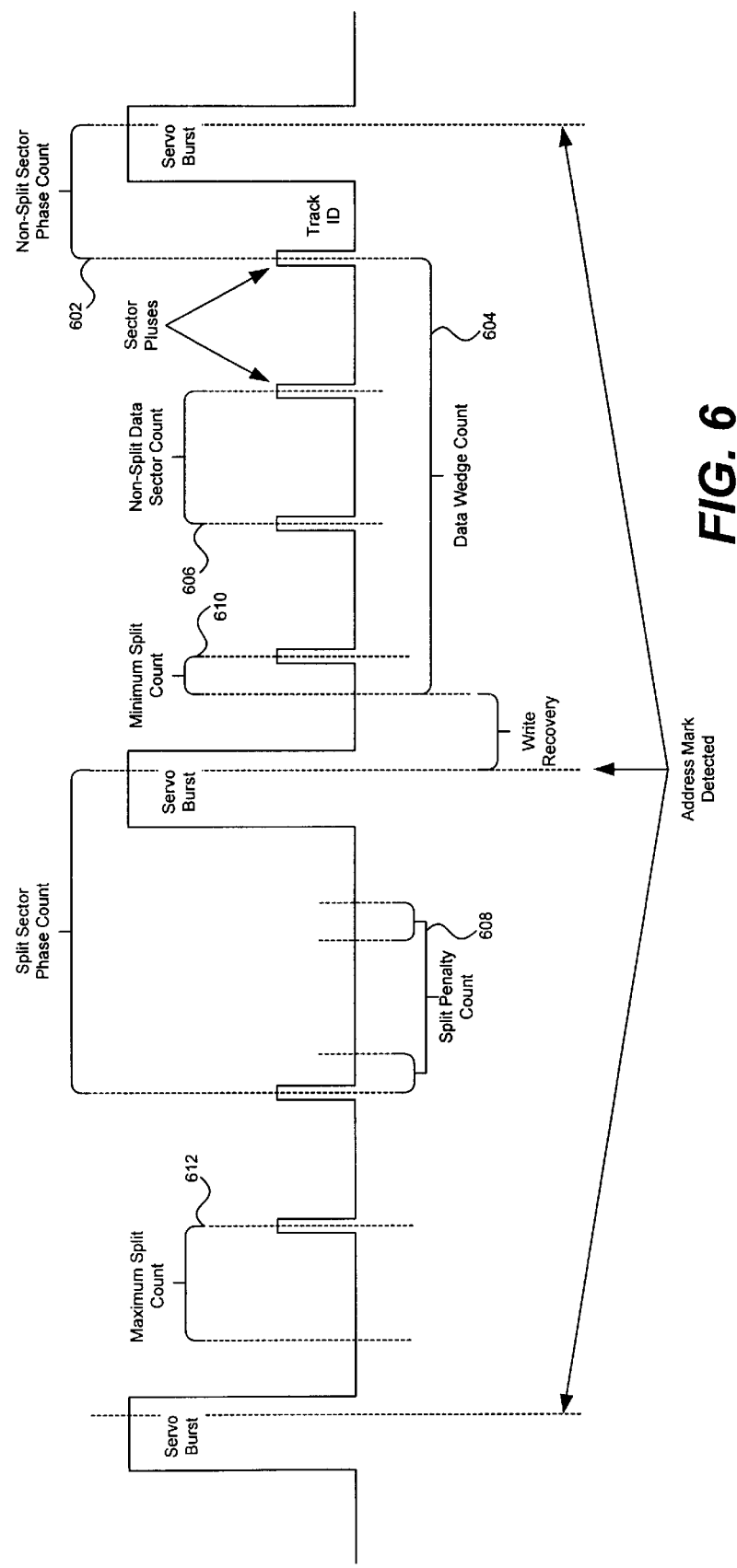
FIG. 6 illustrates frame table parameters used in one embodiment of the present invention for generating a new frame table.

Table 1 contains a non-exclusive list of frame table parameters for generating a new frame table. These parameters are also illustrated in FIG. 6 for additional clarification.

TABLE 1

A list of frame table parameters

| Parameter | Description |
| --- | --- |
| NonSplitSectorPhaseCount | The number of clock pulses between a first servo burst and the first data sector (see 602). |
| DataWedgeCount | The number of clock pulses within a data wedge (see 604). |
| NonSplitDataSectorCount | The number of clock pulses in a non-split data sector (see 606). |
| SplitPenaltyCount | The number of clock pulses in a split penalty (see 608). |
| MinSplitCount | The number of clock pulses in a minimum data sector split (see 610). |
| MaxSplitCount | The number of clock pulses in a maximum data sector split (see 612). |
| ClockConversionFactor | Scaling factor between the sector clock and the data clock. |

The NonSplitSectorPhaseCount is the distance, measured in clock pulses, between the beginning of the frame and the beginning of the first data sector. The value of the NonSplitSectorPhaseCount is generally zone dependent, and is independent of the data recording frequency. The DataWedgeCount is the number of clock pulses in a complete data wedge and generally varies with the data recording frequency. The NonSplitDataSectorCount is the number of data clock pulses in a non-split data sector. Referring back to FIG. 3-1, the NonSplitDataSectorCount is equal to the total clock pulses in the PLO field 302, SYNC field 304, DATA field 306, ECC field 308, and PAD field 310. The SplitPenaltyCount is the number of extra clock pulses added to a data sector when it is split across a servo burst. As shown in FIG. 3-2, the split penalty count is equal to the total clock pulses in the PLO field 320, SYNC field 322, and PAD field 328.

Typically, both the first and second data fields in a split data sector must contain a minimum amount of data for an error correction algorithm to properly detect bit errors. For this reason, the MinSplitCount is used to indicate the minimum number of clock pulses required to be present in the DATA 1 field 306 for a data sector split to occur. The MaxSplitCount specifies the maximum number of clock pulses in the DATA 1 field 306, which is simply another way of specifying the minimum number of clock pulses required to be present in the DATA 2 field 324.

The ClockConversionFactor is used in disc drive architectures with sector and data clocks having differing clock frequencies. In one embodiment of the present invention, frame table entries are calculated using the sector clock frequency and then converted into a data clock frequency when needed. Thus, as described in greater detail below, the ClockConversionFactor is utilized to scale the sector clock when conversion to data clock frequency is required.

Figure 7:
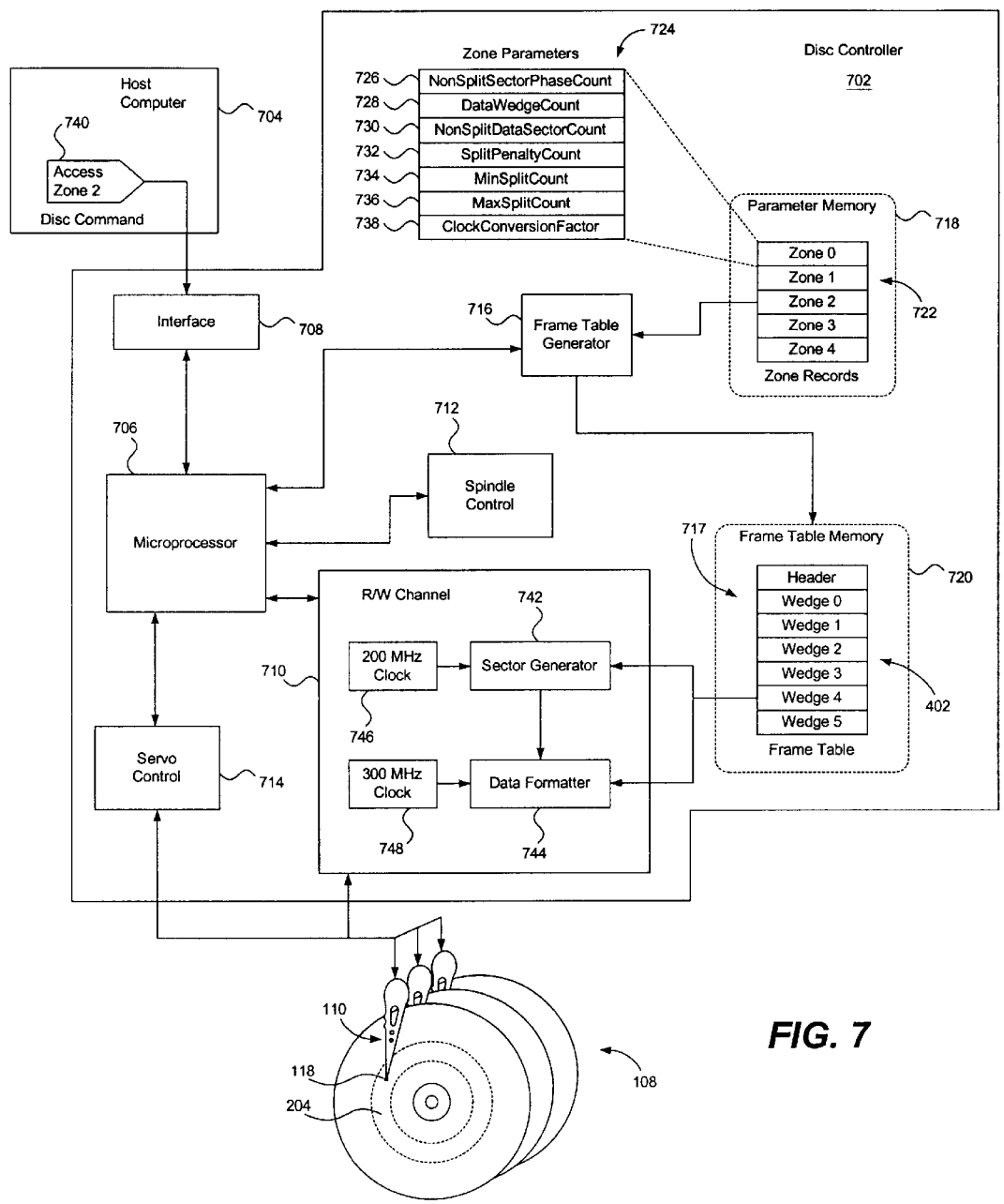
FIG. 7 shows an exemplary disc controller contemplated as one embodiment the present invention.

In FIG. 7, an exemplary disc controller 702 contemplated as one embodiment the present invention is shown. The disc controller 702 is operably connected to a host computer 704 through conventional communication paths. The disc controller 702 includes a microprocessor 706 which generally communicates and controls other disc controller components, such as an interface block 708, a read/write channel 710, a spindle motor control block 712, a servo control block 714, and a frame table generator 716.

The data discs 108 are rotated at a constant high speed by a spindle control block 712. During a seek operation, the track position of the data heads 118 is controlled through the application of current to the voice coil motor 124 (see FIG. 1) of the actuator assembly 110. The servo control block 714 applies a controlled amount of current to the voice coil motor 126, thereby causing the actuator assembly 110 to be pivoted.

Communication is effectuated between the host computer 704 and the disc controller 702 by way of the disc drive interface 708, which typically includes a buffer to facilitate high speed data transfer between the host computer 704 and the disc controller 702. Data to be written to the data disc 108 is thus passed from the host computer 704 to the interface 708 and then to the read/write channel 710, which encodes and serializes the data and provides the requisite write current signals to the data heads 118. To retrieve data that has been previously stored by the data disc 108, read signals are generated by the heads 118 and provided to the read/write channel 710, which performs decoding operations, error detection and correction operations, and outputs the retrieved data to the interface 708 for subsequent transfer to the host computer 704.

The frame table generator 716 creates frame table entries 717 in accordance with the present invention. The frame table generator 716 is coupled with the parameter memory 718 and frame table memory 720. The parameter memory 718 contains an array of zone records 722 corresponding to the disc zones 204 of the data discs 108. Each zone record 722 includes zone parameters 724 which describe the data sector arrangement for a particular disc zone 204. As discussed earlier, the zone parameters 724 may include a NonSplitSectorPhaseCount 726, a DataWedgeCount 728, a NonSplitDataSectorCount 730, a SplitPenaltyCount 732, a MinSplitCount 734, a MaxSplitCount 736, and a ClockConversionFactor 738.

During normal disc drive operation, the controller 702 typically moves the data head 118 to different disc zones 204 in order to access data in various data sectors 222. When the data head 118 is required to move to a different zone location, the frame table generator 716 is activated by the microprocessor 706 to create a new frame table 402 in the frame table memory 720. For example, the host computer 704 may issue a command 740 to the disc controller 702 requiring data located in disc zone 2 to be read. The command 740 is received by the interface block 708 and is communicated to the microprocessor 706. If the data head 118 is not located over disc zone 2, the microprocessor 706 activates the frame table generator 718 to create a frame table 402 for disc zone 2.

In activating the frame table generator 716, the microprocessor 706 provides the frame table generator 716 the disc zone and head number corresponding to the data being accessed. The frame table generator 716 then retrieves the zone parameters 724 from the parameter memory 718. In one embodiment of the invention, the zone records 722 are stored in an array indexed by the zone number and the data head number being accessed. After the appropriate zone record 722 is retrieved from the parameter memory 718, the frame table generator 716 proceeds to construct the frame table 402 in the manner described earlier. It is contemplated that the frame table generator 716 may be implemented using software code, hardware circuitry, or a combination thereof.

Once the frame table 402 is constructed, the read/write channel 710 utilizes the frame table 402 to access disc data. The read/write channel 710 includes a sector generator 742 for keeping track of the current sector location and a data formatter 744 for keeping track of the current data bit location. The sector generator 742 and the data formatter 744 retrieve frame table entries and load them into various counters. In one embodiment of the present invention, the sector generator 742 and the data formatter 744 operate at different clock frequencies. For example, the sector generator 742 counts sectors using a 200 MHz clock 746, while the data formatter 744 counts data bits using a 300 MHz clock 748.

Figure 8:
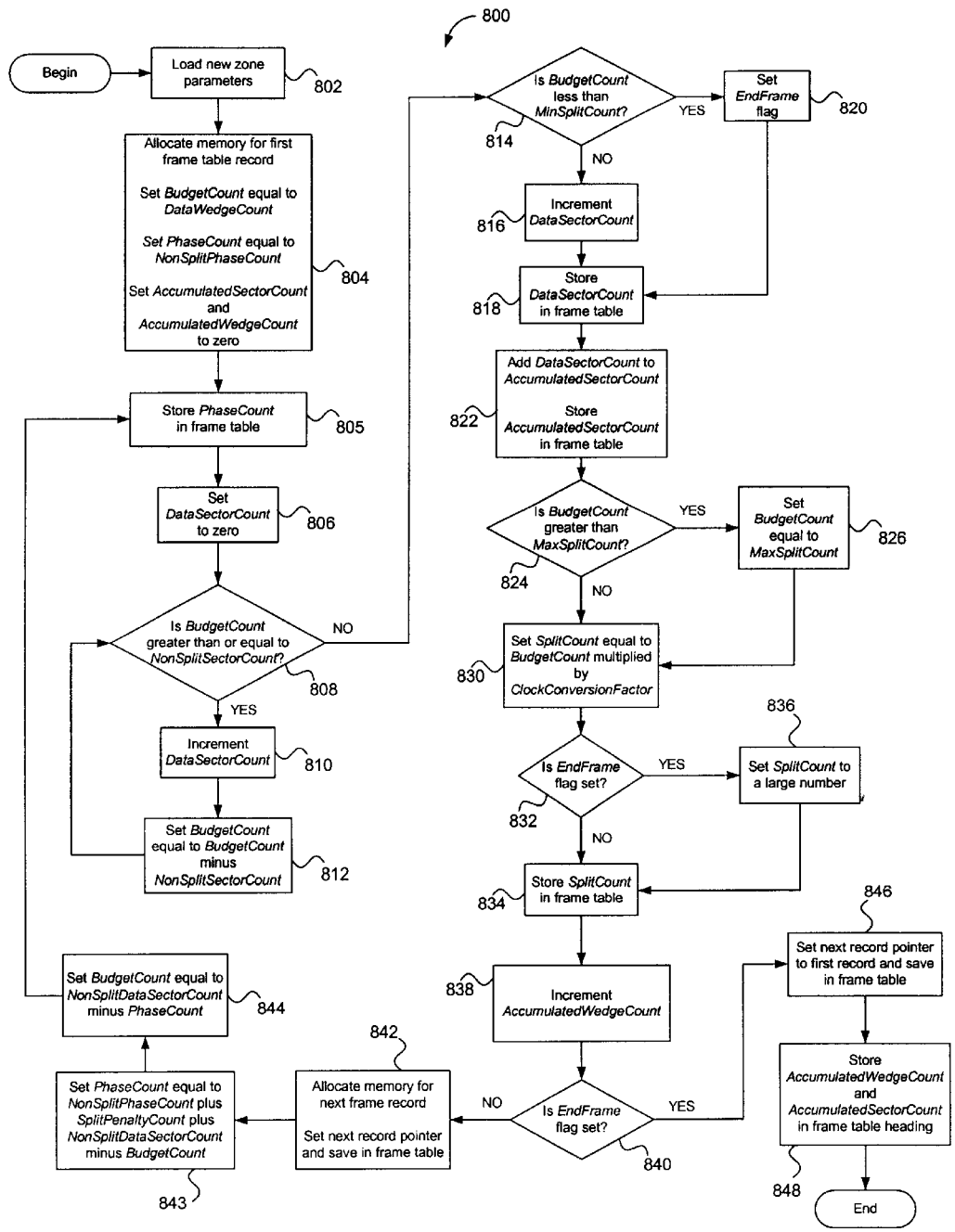
FIG. 8 shows a flow chart describing the operations performed by a frame table generator contemplated by the present invention to create a new frame table when a new data zone is accessed.

FIG. 8 is a flow chart 800 describing the operations performed by the frame table generator 716 (see FIG. 7) to create a new frame table when a new data zone is accessed. The logical operations of this flow chart and the flow chart of FIG. 5 are implemented (1) as a sequence of computer implemented operations or program modules running on a computing system and/or (2) as interconnected machine logic circuits or circuit modules within the computing system. The implementation is a matter of choice dependent on the performance requirements of the computing system implementing the invention. Accordingly, the logical operations making up the embodiments of the present invention described herein are referred to variously as steps, operations, structural devices, acts, or modules. It will be recognized by one skilled in the art that these operations, structural devices, acts and modules may be implemented in software, in firmware, in special purpose digital logic, and any combination thereof without deviating from the spirit and scope of the present invention as claimed.

In module 802, a new set of zone parameters are loaded from parameter memory based according to the zone location to be accessed by the disc drive 100. As earlier discussed, the zone parameters may include, but are not limited to, a NonSplitSectorPhaseCount, a DataWedgeCount, a NonSplitDataSectorCount, a SplitPenaltyCount, a MinSplitCount, a MaxSplitCount, and a ClockConversionFactor. Control then transfers to operational step 804.

In operation 804, several actions are performed before construction of a new frame table begins. This step includes reserving frame table memory for the new frame table. Since the frame table memory is preferably configured to hold only one frame table at a time, allocating memory for the new frame table entries may destroy past frame table entries. operation 804 also initializes variables used during frame table construction. For example, a BudgetCount variable is initialized to the DataWedgeCount zone parameter. The BudgetCount stores the number of sector generator clocks left in data wedges as the frame table is constructed, and is thus initially set to the DataWedgeCount. Similarly, a PhaseCount variable, which stores the number of sector generator clocks in a data wedge phase, is set to the NonSplitPhaseCount. Other variables, such as an AccumulatedSectorCount and an AccumulatedWedgeCount are initialized to zero. Control then transfers to operation 805.

In operation 805, the PhaseCount is stored in the frame table as the Phase Count entry 416 (see FIG. 4) of the first data wedge record. The memory location of this entry is calculated using the base address of the allocated frame table memory along with a known memory offset. Control then transfers to operation 806.

In operation 806, a DataSectorCount variable is set to zero. The DataSectorCount variable maintains a running count of data sectors in the current data wedge. As described below, the DataSectorCount variable is later added to the AccumulatedSectorCount variable. Control then transfers to query operation 808.

The BudgetCount variable is tested in query operation 808 against the NonSplitSectorCount frame table parameter.

If the BudgetCount is greater than or equal to the NonSplitSectorCount parameter, then at least one complete data sector can fit in the current data wedge, and control is passed to operation 810. In operation 810, the DataSectorCount is incremented to account for another data sector added to the data wedge and control passes to operation 812, where the NonSplitSectorCount parameter is subtracted from the BudgetCount, thereby accounting for the sector generator clocks consumed by the added data sector in the wedge. Operations 808, 810, and 812 are then repeated until, at some point, the BudgetCount variable is reduced to less than the NonSplitSectorCount. At this point, control is passed to query operation 814.

In operation 814, the BudgetCount is compared to the MinSplitCount 610 parameter. If the BudgetCount is less than the MinSplitCount 610, this indicates that the first portion of the current data sector 228 (See FIG. 3) will be smaller than the minimum amount of data necessary for error correction and the current data sector cannot be split across a servo burst 214. In this case control transfers to operation 820 where an EndFrame flag is set to mark the current data wedge as the last wedge entry in the frame table 402. If the BudgetCount is greater than or equal to the MinSplitCount 610, then the current data sector may be split across a servo burst. When this condition is satisfied control is passed to operation 816 which increments the DataSectorCount.

After either operation 820 or operation 816 is completed, control is passed to operation 818 which stores the DataSectorCount as a frame table entry 414. Control then transfers to operation 822. In operation 822, the DataSectorCount is added to the AccumulatedSectorCount, and the AccumulatedSectorCount is also stored in the frame table 402.

Control then proceeds to operation 824 where the BudgetCount is tested against the MaxSplitCount parameter. If the BudgetCount is greater than the MaxSplitCount, this indicates that the second portion of the current sector 230 (See FIG. 3) will be smaller than the minimum amount of data necessary for error correction. To overcome this problem, in step 826 the BudgetCount is set equal to the MaxSplitCount 612, thereby reducing the size of the first section of the current data sector and increasing the size of the second portion of the current data sector. If the BudgetCount is not greater than the MaxSplitCount 612, or after the BudgetCount is adjusted to be equal to the MaxSplitCount 612 in step 826, control is passed to operation 830.

In operation 830, a SplitCount is created by multiplying the BudgetCount by the ClockConversionFactor parameter. The SplitCount is thus equal to the number of data formatter clock pulses in the first split portion of the current data sector. As mentioned previously, the sector generator 742 and the data formatter 744 (see FIG. 7) may run at different clock frequencies. Thus, step 830 converts the BudgetCount from the sector generator one clock frequency to the data formatter clock frequency. Control is then passed to query operation 832.

In query operation 832, the EndFrame flag is tested. If the EndFrame flag was not set at operation 820, then control is passed to operation 834 where the SplitCount is stored in the frame table 402. If the EndFrame flag is set, then control is passed to operation 836 where the SplitCount is set to a large number, such as 0x7FFF, and this new SplitCount value is stored in the frame table 402 in operation 834. Placing a large number in the SplitCount ensures that the data formatter does not create a split sector. Control then transfers to operation 838.

In operation 838, the AccumulatedWedgeCount is incremented to reflect that the current wedge record is added to the frame table. Control then passes to query operation 840 which examines the EndFrame flag to determine if another wedge record needs to be added to the frame table 402. If the EndFrame flag is not set, operation 842 is carried out. In operation 842, memory is allocated for the next frame table record. In addition, the next record pointer entry 420 of the current frame table record is set to the allocated memory of the next frame record. Control then transfers to operation 843.

In operation 843, a new PhaseCount 416 is calculated. The new PhaseCount contains the number of clock pulses between the servo burst ending the current data wedge and the next non-split data sector in the frame. Thus, the PhaseCount 416 is set equal to the NonSplitPhaseCount parameter plus a SplitPenaltyCount parameter plus the NonSplitDataSectorCount parameter minus the BudgetCount. Control then transfers to operation 844.

In operation 844, a new BudgetCount is calculated taking into account the second portion of split data sector of the previous frame table record. Thus, the new value of the BudgetCount is equal to the NonSplitDataSectorCount minus the PhaseCount. After the BudgetCount is calculated for the next frame table record, flow returns to operation 805 where the PhaseCount of the next frame table record is stored and the entire process discussed above is repeated.

When the frame table eventually reaches the last frame record and the EndFrame flag is set, query operation 840 branches to operations 846 and 848 where the frame table 402 is completed. At operation 846 the next record pointer 424 of the last frame table record is set to the beginning of the first frame table record, creating a circular linked list. At operation 848, the AccumulatedWedgeCount and the AccumulatedSectorCount are stored in the frame table heading.

In summary, the present invention may be viewed as a method of determining data sector splits (such as 228 and 230) across servo bursts (such as 226), wherein a servo burst (such as 226) and a plurality of data sectors (such as 222) define a wedge (such as 216), and a plurality of wedges (such as 216) define a frame. The method includes the steps of locating one or more frame table parameters (such as 724) based on a new zone position (such as 204), creating a plurality of new frame table entries (such as 717), while the disc drive is in operation, based on the frame table parameters (such as 724), and moving the data head (such as 118) from a past zone position (such as 204) to the new zone position (such as 204).

The method may further include the step of replacing a plurality of past frame table entries (such as 717) with the new frame table entries (such as 717). The method may also include the step of storing the new frame table entries (such as 717) in substantially the same memory location (such as 720) as the past frame table entries (such as 717). In another embodiment of the invention, the past zone position (such as 204) and the new zone position (such as 204) have different bit densities. Furthermore, the locating step and the creating step may be performed before the moving step or at substantially the same time as the moving step. In yet another embodiment of the invention, the method may further include the step of receiving a command (such as 740) to access a new data sector (such as 222) within the new zone position (such as 204).

Alternatively, the present invention may also be embodied as a disc drive (such as 100) having an embedded servo configuration on a data disc (such as 108), the data disc (such as 108) having a plurality of zones (such as 204) of predefined tracks (such as 206) on the data disc (such as 108), the disc drive (such as 100) having a data transducer (such as 118) selectively positionable over the data disc (such as 108) for transferring data to and from the data disc (such as 108), the data disc (such as 108) further having data sector splits (such as 224) across servo bursts (such as 214), wherein a servo burst (such as 214) and a plurality of data sectors (such as 222) define a wedge (such as 216), and a plurality of wedges (such as 216) defines a frame. The disc drive (such as 100) comprises parameter memory (such as 718) including a plurality of zone records (such as 722), the zone records (such as 722) including a plurality of zone table parameters (such as 724). The disc drive (such as 100) also includes frame table memory (such as 720) for storing a frame table (such as 402), and a frame table generator (such as 716) coupled with the parameter memory (such as 718) and the frame table memory (such as 720). The frame table generator (such as 716) is configured to create a new frame table (such as 402) in the frame table memory (such as 720) when the data transducer (such as 118) is required to move to a new zone position (such as 204).

In another embodiment of the disc drive (such as 100), the disc drive (such as 100) may further include a sector generator (such as 742) coupled with the frame table (such as 402), the sector generator (such as 742) receiving indication from the frame table (such as 402) of disc servo burst locations (such as 214). The disc drive (such as 100) may also include a data formatter (such as 744) coupled with the frame table (such as 402), the data formatter (such as 744) receiving indication from the frame table (such as 402) of disc data sector locations (such as 222).

Alternatively, in another embodiment of the disc drive (such as 100), the zone table parameters (such as 724) include a non-split phase count (such as 726), a data wedge count (such as 728), a non-split data sector count (such as 730), and a split penalty count (such as 732). In a further embodiment of the disc drive (such as 100), the zone table parameters (such as 724) may include a minimum split count (such as 734) and a maximum split count (such as 736). In another embodiment of the disc drive (such as 100), the zone table parameters (such as 724) may include a minimum split count (such as 734) and a clock conversion factor (such as 738).

The present invention may also be viewed as a method of determining data sector splits (such as 224) across servo bursts (such as 214) in a disc drive (such as 100) having an embedded servo configuration on a data disc (such as 108). The data disc (such as 108) includes a plurality of zones (such as 204) of predefined tracks (such as 206), and the disc drive (such as 100) having a data transducer (such as 118) selectively positionable over the data disc (such as 108) for transferring data to and from the data disc (such as 108). In this embodiment, a servo burst (such as 214) and a plurality of data sectors (such as 222) define a wedge (such as 216), and a plurality of wedges (such as 216) defines a frame. The method includes the steps of determining a current zone position (such as 204) of the data transducer (such as 118), locating a set of frame table parameters (such as 724) based on the current zone position of the data transducer (such as 118), and determining frame table entries (such as 402) including a split count (such as 418) for the wedges (such as 216) from the frame table parameters (such as 724) during drive operation.

The set of frame table parameters (such as 724) may further include a non-split sector phase count of clock pulses between a first servo burst and an adjacent data area (such as 602), a wedge data count of clock pulses within the data area (such as 602), a non-split sector count of clock pulses within a sector (such as 606), a split penalty count of clock pulses for a split sector (such as 606), a minimum split count of clock pulses for the split sector (such as 610), and a maximum split count of clock pulses for the split sector (such as 612).

In another embodiment of the present invention, the step of determining frame table entries (such as 402) may also include the steps of setting a current budget counter to the wedge data count (such as 802), iteratively subtracting the non-split sector count from the current budget counter and incrementing a sector count until the current budget counter is less than the non-split sector count (such as 808 and 812), and determining a next phase count equal to the sum of the non-split sector count, the non-split sector phase count, and the split penalty count, minus the current budget counter (such as 843). In another embodiment of the invention, the step of determining frame table entries (such as 402) may further include a step of determining an initial phase count equal to the non-split sector phase count (such as 804).

In yet another embodiment of the invention, the step of determining frame table entries (such as 402) may further include a step of checking the current budget counter for a splitting rule violation after the iteratively subtracting step (such as 814 and 824). In one embodiment of the invention the step of checking the current budget counter for a splitting rule violation (such as 814 and 824) may include the steps of comparing the current budget counter to the maximum split count (such as 824), and setting the current budget counter to the maximum split count if the current budget counter is greater than the maximum split count (such as 826). In another embodiment of the present invention, checking the current budget counter for a splitting rule violation (such as 814 and 824) may include the steps of comparing the current budget counter to the minimum split count (such as 814), incrementing the sector count if the current budget counter is greater than or equal to the minimum split count (such as 816), and setting a last wedge flag if the current budget counter is less than the minimum split count (such as 820). In another embodiment of the invention, a non-split value may be stored in the current budget counter if the last wedge flag is set (such as 836).

In another embodiment of the present invention, the step of determining frame table entries (such as 402) may further include a step of scaling the split count by a clock conversion factor (such as 830). Furthermore, in one embodiment of the invention, frame table may include a linked list of wedge entries (such as 402). In one embodiment of the invention, the method includes the step of storing a next wedge entry pointer in the frame table (such as 842).

The present invention may also be viewed as a method for calculating data sector splits (such as 228) across servo bursts (such as 214) in a disc drive (such as 100). The disc drive (such as 100) has an embedded servo configuration, with the disc drive (such as 100) including a plurality of zones (such as 204) of predefined tracks (such as 206) on a data disc (such as 108) and at least one transducer (such as 118) selectively positionable over the data disc (such as 108). A pair of servo bursts (such as 214) defines a wedge (such as 216) having plurality of data sectors (such as 222). The method includes the step of determining a new zone position of the transducer (such as 502). The method further includes indexing a set of frame table variables based on the new zone position of the data head (such as 504), the set of frame table variables including a non-split sector phase count of clock pulses between a first servo burst and a data area (such as 602), a wedge data count of clock pulses within the data area (such as 604), a non-split sector data count of clock pulses within a sector (such as 606), a split penalty count of clock pulses for a split sector (such as 608), a minimum split count of clock pulses for the split sector (such as 610), and a maximum split count of clock pulses for the split sector (such as 612). The method also includes constructing a frame table from the frame table variables during drive operation (such as 506).

Another embodiment of the present invention may be further viewed as a method for dynamically constructing a hard disc frame table (such as 402) for a particular zone location (such as 204). The frame table (such as 402) is based in part on a stored non-split sector phase count (such as 726), a wedge data count (such as 728), a non-split sector count (such as 730), and a split penalty count (such as 732). The method includes setting a current budget counter to the wedge data count (such as 804), iteratively subtracting the non-split sector count from the current budget counter (such as 812) and incrementing a sector count (such as 810) until the current budget counter is less than the non-split sector count (such as 808). The method further includes storing a next phase count in the frame table (such as 843), where the next phase count is equal to the sum of the non-split sector count, the non-split sector phase count, and the split penalty count, minus the current budget counter. The method also includes storing a split count in the frame table (such as 834), where the split count being equal to the current budget counter minus the split penalty count, and storing the sector count in the frame table (such as 818).

In yet another embodiment, the present invention includes a controller (such as 702) for a data storage device (such as 100) having an embedded servo configuration. The controller (such as 702) includes a set of frame table parameters (such as 724) and a means for constructing a frame table from the frame table parameters during data storage device operation (such as 500 or 800).

It will be clear that the present invention is well adapted to attain the ends and advantages mentioned as well as those inherent therein. While the presently preferred embodiments have been described for purposes of this disclosure, various changes and modifications may be made which are well within the scope of the present invention. For example, the present invention may be adapted for use in an optical disc drive configuration, such as a Compact Disk (CD) or Digital Versatile Disk (DVD). Thus, numerous other changes, combinations, and arrangements of techniques may be made which will readily suggest themselves to those skilled in the art and which are encompassed in the spirit of the invention disclosed and as defined in the appended claims.

What is claimed is:

1. A method comprising steps of:
   a) locating one or more frame table parameters based on a new zone position;
   b) creating a plurality of new frame table entries, while an apparatus is in operation, based on the frame table parameters and not based on a frame number determined from processing a servo sector or on an end-of-sector pulse; and
   c) moving an arm of the apparatus from a past zone position to the new zone position.

2. The method of claim 1, wherein the creating step (b) includes a step (b)(i) of replacing a plurality of past frame table entries with the new frame table entries.

3. The method of claim 1, wherein the past zone position and the new zone position have different bit densities.

4. The method of claim 1, wherein the locating step (a) and the creating step (b) are performed before the moving step (c).

5. The method of claim 1, wherein the creating step (b) is performed at substantially the same time as the moving step (c).

6. The method of claim 1, further comprising a step of receiving a command to access a new data sector within the new zone position.

7. The method of claim 1 wherein step (b) is performed during step (c).

8. The method of claim 2, wherein to replacing step (b)(i) includes storing the new frame table entries in substantially the same memory location as the past frame table entries.

9. An apparatus comprising:
   a parameter memory including a plurality of zone records, the zone records including a plurality of zone table parameters;
   a frame table memory for storing a frame table;
   a frame table generator coupled with the parameter memory and the frame table memory, the frame table generator configured to create a new frame table to be stored in the frame table memory when a moveable arm is requested to move to a new zone position, the new frame table is created independent of a frame number determined from processing a servo sector or an end-of-sector pulse.

10. The disc drive of claim 9, further including:
    a sector generator coupled with the frame table, the sector generator receiving indication from the frame table of disc servo burst locations; and
    a data formatter coupled with the frame table, the data formatter receiving indication from the frame table of disc data sector locations.

11. The disc drive of claim 9, wherein the zone table parameters include a non-split phase count, a data wedge count, a non-split data sector count, and a split penalty count.

12. The disc drive of claim 9 wherein the zone table parameters further include a minimum split count and a maximum split count.

13. The disc drive of claim 9, wherein the zone table parameters further include a minimum split count and a clock conversion factor.

14. A controller for a data storage device having an embedded servo configuration, the controller comprising:
    a set of frame table parameters; and
    means for constructing a frame table from the frame table parameters during data storage device operation, the frame table is constructed independent of a frame number determined from processing a servo sector or an end-of-sector pulse.

* * * * *